Nov. 25, 1952　　　F. L. STRUBEN ET AL　　　2,618,820
TRAILER AWNING
Filed July 17, 1950
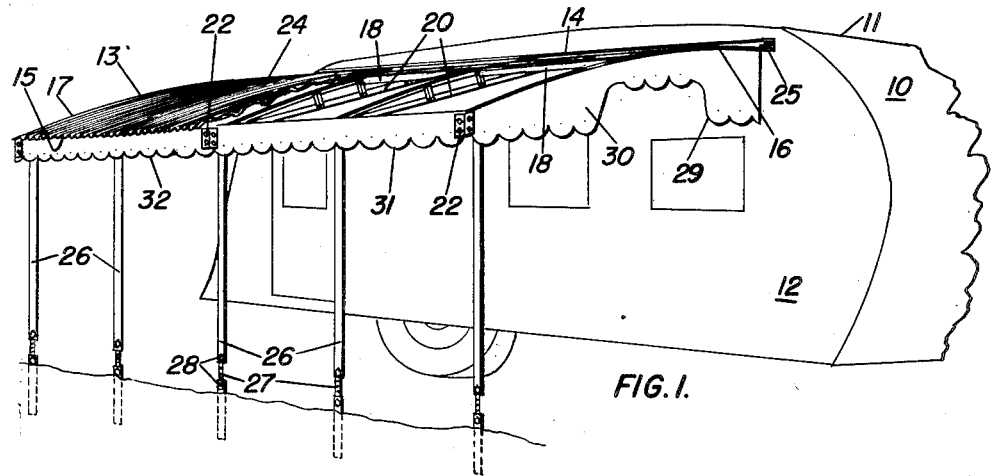
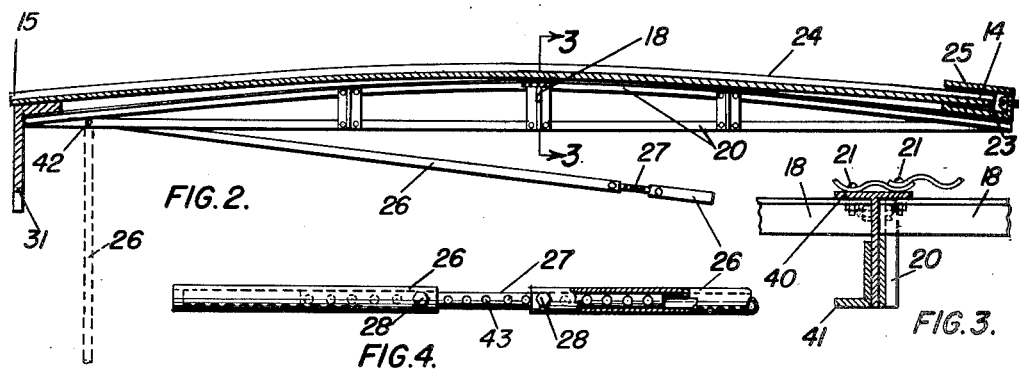
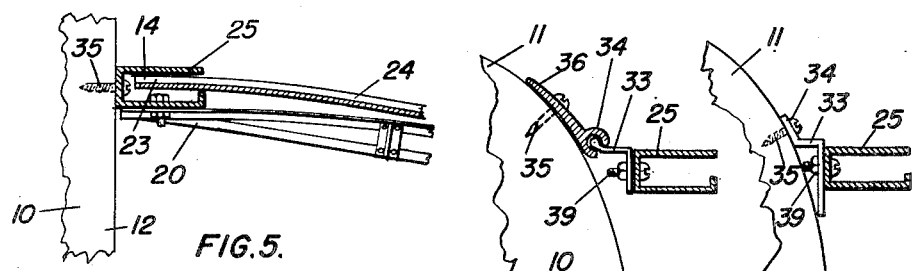
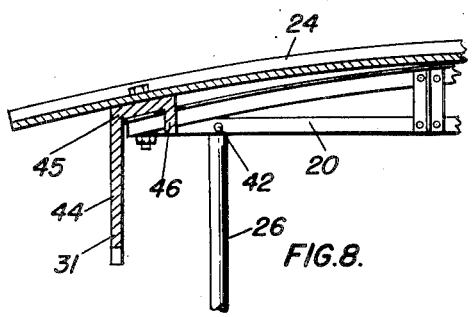
INVENTORS.
FRANCIS L. STRUBEN.
JAMES W. FYLE JR.
BY Howard J. Whelan
ATTORNEY.

Patented Nov. 25, 1952

2,618,820

UNITED STATES PATENT OFFICE 2,618,820

TRAILER AWNING

Francis L. Struben and James W. Fyle, Jr., Baltimore, Md., assignors, by direct and mesne assignments, to said Struben and Richard A. Albright, Baltimore, Md., jointly Application July 17, 1950, Serial No. 174,258

2 Claims. (Cl. 20—57.5)

This invention relates to awnings and more particularly to those adapted for use with trailers and the like.

It is an object of this invention to provide an awning for a trailer that will be placeable at the side of the trailer, to add to its comfort and use, when the trailer has stopped at a designated location for an appreciable period.

Another object of the invention is to provide a new and improved awning for a trailer that can be portably attached and removed.

A further object of the invention is to provide a new and improved awning for a trailer that is easily attached to the exterior body thereof and made adjustable to meet varying conditions of height at the location where the trailer is stopped.

An additional object of the invention is to provide a new and improved awning for a trailer that is easily placed in position on a conventional trailer with minor provision for its attachment thereto; that will be light, strong and compact, and capable of being packaged on the trailer when not in use, so it can be carried from one place to another conveniently.

Other objects of the invention will be disclosed as it is outlined in more detail.

For a clearer understanding of the invention and its objects reference is made to the accompanying drawings. These drawings when used in conjunction with the following description illustrate a particular structure of the invention by way of example, while the claims indicate the scope thereof.

In the drawings:

Figure 1 is a general view in perspective of an awning embodying this invention shown applied to a conventional house trailer, parts of the awning being broken away to indicate its interior construction:

Figure 2 is a side elevation of the roof truss with the roof shown in section as used in this embodiment;

Figure 3 is a sectional elevation taken transversely on line 3—3 of Figure 2;

Figure 4 is a partial detail of the adjustable supporting post used with this embodiment;

Figure 5 is a detail of the attachment of the decking, truss and hanger, partly in section, attached to the straight side of a trailer;

Figure 6 is a sectional detail of a modified form of hanger for use on a curved trailer wall;

Figure 7 is another form of hanger in section for use on a curved trailer wall; and Figure 8 is a typical sectional elevation of the roof truss and telescopic supporting posts, decking and apron to show the method of connecting the ends of the trusses to support the decking thereon.

Similar parts are designated by the same reference numbers throughout the drawings.

The drawings indicate a conventional trailer 10, of the household type, with the roof 11 formed to connect with the side walls 12 as shown. The awning 13 included in this invention has its canopy or decking 24 slidably fastened to the roof 11 or wall 12 along one of its longitudinal edges 14, while the other or opposite edge 15 is supported from the ground. The side edges 16 and 17 are free. This gives the awning a rectangular appearance, but for practical reasons it is made slightly arcuate and tilted downwardly towards the front as shown in Figure 1. It is also preferable that the awning decking be corrugated to drain towards the front. The underside of the awning decking is supported on a series of trusses 20 preferably stamped from sheet metal and including a T form 40 having an angle 41 attached to its lower end to increase the strength of the truss. The trusses 20 may be of lightened construction as shown in Figure 3. The top of the flanges of the T braces 18 are punched or perforated with holes so they may be connected between the trusses 20 to form bracing therebetween and to support the decking 24 placed thereon, and anchored by bolts 21. The roof or decking may be made of several sheets or pieces of material preferably corrugated and interlocked together and bolted as shown in the drawings. The ends 23 of the trusses 20 are squared off and formed to enable them to be attached to a hanger 25 which is U-form in section to hold the awning to the roof of the trailer. The free edge of the awning is supported at the trusses by telescopic posts 26 suitably swivelled thereto at 42. These posts are made long enough to permit their being driven into the ground about 30 inches or attached thereto. The middle portion 27 of the post is of a smaller diameter and is made slidable, one part over the other, and perforated at 43 so that various adjustments can be made in the height. The bolts 28 fit in holes in posts 25 and through holes 43 in middle portion 27 for adjustment. The trusses 20 are made in the form indicated, which is of a modified bow-string type, the bottom chord being horizontal and aligned throughout. A truss is installed at each side of the awning, and serves as a support for the attachment of aprons 30. These aprons improve the looks of the awning and keep some of the rain from beating in from that direction. They are fastened to the end trusses and are overlapped by the awning decking 24. The end trusses, aprons and decking are all fastened together by bolts for easy removal. The aprons are scalloped at their lower ends into a series of semi-circular contours 29. Similarly a front apron 31 is employed and has a scalloped fringe 32. The apron 31 has a front 44 with a top portion 45 bent to an angle and an inner ledge 46 bent downwardly therefrom. The inner ledge 46 is cut back to the top portion 45 so the apron 31 can be fitted over the edges of the trusses to form a support for the ends of the decking 24 to be attached thereto by bolts. The hanger 25 used for attaching the trusses to the trailer and holding the awning, is subject to variation, as there are several types of trailers and the roof constructions encountered during the installation of the awning.

In the modified forms shown in Figures 6 and 7 the hanger 25 is removably attached to a structural angle 33 which is attached to the hanger by bolts 39. The angle is attached to the trailer by a fastener 36 through the use of a bolt 35.

This construction is simple but effective. It gives the owner of a trailer the benefit of having the equivalent of a porch attached to his trailer, usable whenever he stops off at a location. It is portable, so that it can be made an adjunct to the trailer and conveniently taken with it wherever it goes, without being in the way. It is adjustable to suit different heights and can be handled by a single individual, so that it meets the usual requirements and conveniences arising for an item of this nature.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. An awning for a trailer or the like comprising a U-shaped hanger secured to the trailer and extending along one side thereof, a series of parallel truss members comprising T-shape members and strengthening angle elements secured to the web of the T-shape members, each of the truss members having one end secured to the lower leg of the U-shaped hanger and each having their free end extending outwardly from the trailer, a decking resting on the truss members, said decking having one edge secured between the legs of the U-shaped hanger, and a series of parallel cross-braces extending between the T-shape members of the said truss members and connected thereto at their ends, and a plurality of adjustable posts each having one end detachably secured to the free end of each of the truss members and having the other end secured in the ground.

2. An awning as set forth in claim 1 including separately attachable aprons having a flange extending along the free ends of the truss members between said members and the decking and another flange extending downwardly in front and at the sides of the awning at right angles to the first mentioned flange.

FRANCIS L. STRUBEN.
JAMES W. FYLE, Jr.

REFERENCES CITED

The following references are of record in the file of this patent:

UNITED STATES PATENTS

| Number | Name | Date |
| --- | --- | --- |
| 323,418 | Hildebrandt | Aug. 4, 1885 |
| 1,845,143 | Friesner | Feb. 16, 1932 |
| 1,930,595 | Moser | Oct. 17, 1933 |
| 2,210,460 | Mackintosh | Aug. 6, 1940 |
| 2,277,341 | Mancusi | Mar. 24, 1942 |
| 2,423,402 | Olsen | July 1, 1947 |
| 2,424,410 | Miles | July 22, 1947 |
| 2,427,021 | Rapp | Sept. 9, 1947 |